US008673157B2

(12) United States Patent
Kolios et al.

(10) Patent No.: US 8,673,157 B2
(45) Date of Patent: Mar. 18, 2014

(54) PHOTOREACTOR

(75) Inventors: Grigorios Kolios, Neustadt (DE); Florina Corina Patcas, Ludwigshafen (DE); Goetz-Peter Schindler, Ludwigshafen (DE); Alexandra Seeber, Lambsheim (DE); Gerrit Waters, Karlsruhe (DE)

(73) Assignee: BASF SE, Ludwigshafen (DE)

( * ) Notice: Subject to any disclaimer, the term of this patent is extended or adjusted under 35 U.S.C. 154(b) by 7 days.

(21) Appl. No.: 13/395,935

(22) PCT Filed: Sep. 13, 2010

(86) PCT No.: PCT/EP2010/063349
§ 371 (c)(1),
(2), (4) Date: Mar. 14, 2012

(87) PCT Pub. No.: WO2011/032900
PCT Pub. Date: Mar. 24, 2011

(65) Prior Publication Data
US 2012/0168300 A1   Jul. 5, 2012

(30) Foreign Application Priority Data

Sep. 15, 2009  (EP) ..................... 09170285

(51) Int. Cl.
*B01J 19/12* (2006.01)
*C02F 1/30* (2006.01)
*B01J 19/08* (2006.01)

(52) U.S. Cl.
USPC . 210/748.09; 210/251; 210/749; 210/748.01; 210/153; 422/168; 422/186; 422/186.3; 422/198; 204/158.2; 250/336.1; 250/365; 250/363.01; 250/361 R

(58) Field of Classification Search
USPC ............ 210/748.01, 748.09, 748.06, 748.19, 210/749, 767, 791, 251, 153; 422/20, 22, 422/186, 186.3, 198; 250/336.1, 361 R, 250/363.01, 365; 204/158.2
See application file for complete search history.

(56) References Cited

U.S. PATENT DOCUMENTS 5,564,065 A    10/1996  Fleck et al.
5,683,589 A *  11/1997  de Lasa et al. ........... 210/748.14
(Continued)

FOREIGN PATENT DOCUMENTS

EP     1247576 A1   10/2002
EP     1946781 A1    7/2008
JP    2004024461 A    1/2004

OTHER PUBLICATIONS

International Search Report for PCT/EP2010/063349, mailing date Apr. 1, 2011.

*Primary Examiner* — Joseph Drodge
*Assistant Examiner* — Cameron J Allen
(74) *Attorney, Agent, or Firm* — Novak Druce Connolly Bove + Quigg LLP

(57) ABSTRACT

The present invention relates to a reactor for the photocatalytic treatment of liquid or gaseous streams, which reactor comprises a tube through which the stream to be treated flows, wherein, in the tube, there are arranged at least one light source, at least one flat means M1 provided with at least one photocatalytically active material and at least one flat means M2 reflecting the light radiation radiated by the at least one light source, wherein the reflecting surface of the at least one means M2 and the inner wall of the tube are at an angle greater than or equal to 0°, in such a manner that the light exiting from the light source is reflected by the at least one means M2 onto the photocatalytically active material, and to a method for the photocatalytic treatment of liquid or gaseous streams by irradiation with light in the reactor according to the invention.

12 Claims, 1 Drawing Sheet

(56) References Cited

U.S. PATENT DOCUMENTS

| | | | |
|---|---|---|---|
| 6,342,128 B1 | 1/2002 | Tabatabaie-Raissi et al. | |
| 6,849,177 B2 * | 2/2005 | Murata et al. | 210/192 |
| 2001/0007507 A1 | 7/2001 | Iimura | |
| 2011/0042326 A1 | 2/2011 | Seeber et al. | |
| 2012/0091068 A1 | 4/2012 | Patcas et al. | |
| 2012/0100985 A1 | 4/2012 | Seeber et al. | |

* cited by examiner

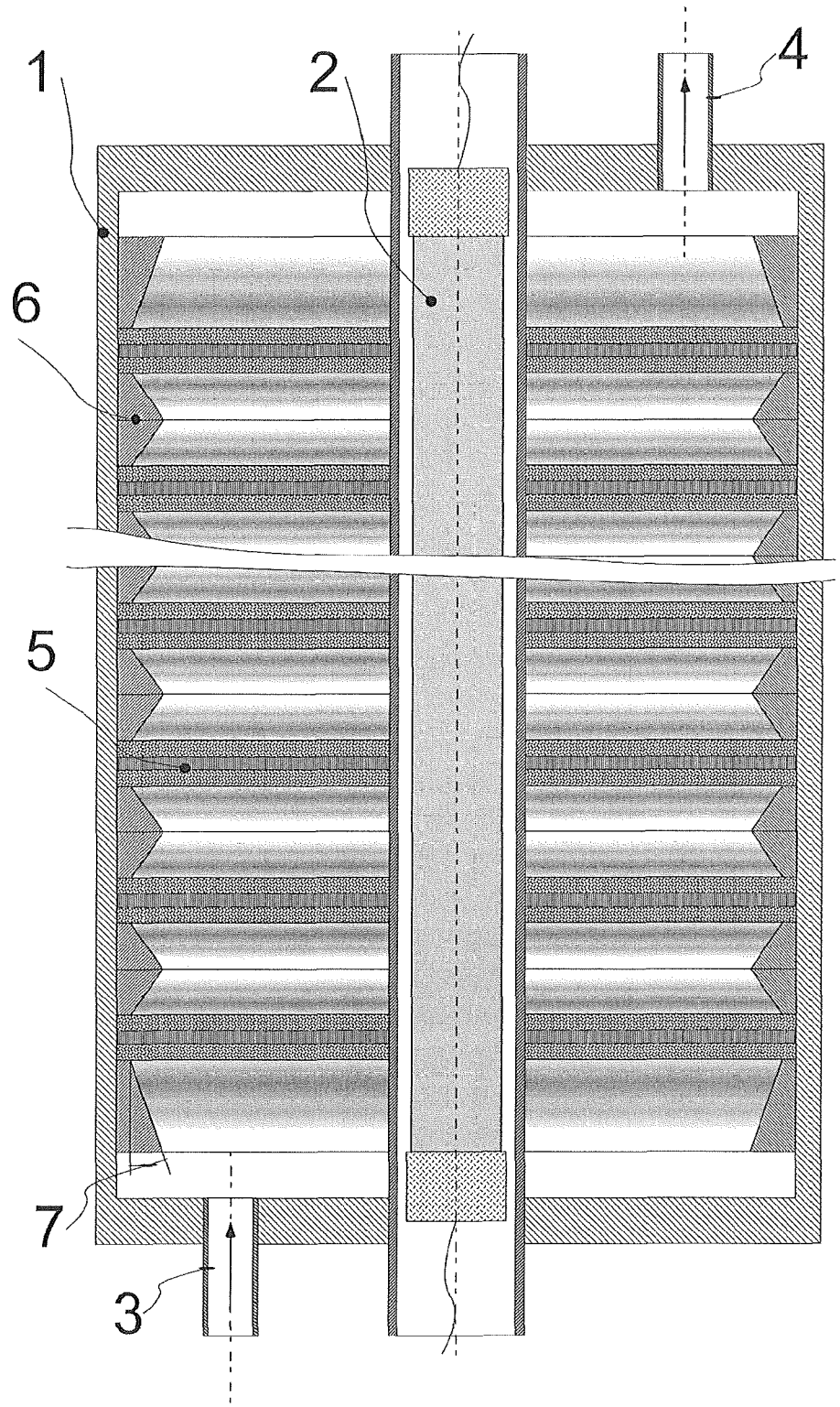

ously known from the prior art. This is of particular importance in the case of oil refineries, papermaking factories, mines, in the food sector or in the chemical industry, the private sector, for example sports facilities, restaurants, hospitals or can be of natural origin. In the case of exhaust gases as pollutant-comprising stream which is to be treated, these can also originate from combustion plants or internal combustion engines. Generally, the interfering substances which must be removed from the wastewater or the exhaust gas are selected from organic or inorganic substances which,

PHOTOREACTOR

PRIORITY

Priority is claimed as a national stage application, under 35 U.S.C. §371, to PCT/EP2010/063349, filed Sep. 13, 2010, which claims priority to European Application No. 09170285.2, filed Sep. 15, 2009. The disclosures of the aforementioned priority applications are incorporated herein by reference in their entirety.

The present invention relates to a reactor for the photocatalytic treatment of liquid or gaseous streams, which reactor comprises a tube through which the stream to be treated flows, wherein, in the tube, there are arranged at least one light source, at least one flat means M1 provided with at least one photocatalytically active material and at least one flat means M2 reflecting the light radiation radiated by the at least one light source, wherein the reflecting surface of the at least one means M2 and the inner wall of the tube are at an angle greater than or equal to 0°, in such a manner that the light exiting from the light source is reflected by the at least one means M2 onto the photocatalytically active material, and also to a method for the photocatalytic treatment of liquid or gaseous streams by irradiation with light, which method is carried out in such a reactor.

Reactors in which photocatalytic reactions, in particular the photocatalytic treatment of liquids or gases, are carried out are already known from the prior art.

US 2001/0007507 A1 describes a reactor for carrying out photocatalytic reactions, wherein the side surfaces of UV-conducting plates are coated with photocatalytically active material. The liquid or the gas which is to be purified is arranged in parallel to at least one of these plates. By means of a UV light source, then, from the edge surface of the plates, UV radiation is radiated in parallel to the plates. By means of total reflection between the two side surfaces of the plates this UV radiation is deflected through the catalyst coating in the direction of the liquid to be purified or the gas to be purified. Owing to the fact that the light must pass through the plate and the catalyst coating up to the contact points with the medium to be purified, it increasingly loses intensity, and the photocatalytic activity is decreased.

U.S. Pat. No. 5,683,589 discloses a reactor for carrying out photocatalytic reactions. This reactor comprises two concentrically arranged tubes wherein a UV light source is present in the inner tube. In the region between inner tube and outer tube conical sheets provided with holes are arranged, on which sheets a photocatalyst is applied. By means of the conical arrangement of the sheets, the surface thereof is radiated with UV radiation. U.S. Pat. No. 5,683,589 discloses, in addition, that the inside of the outer tube can be coated so as to reflect. In the arrangement described, owing to the mutual shadowing of the conical catalyst sheets, even in the case of a reflective coating of the outer tube, principally the inner surface of the cones is irradiated and the catalytic surface is exploited only inadequately.

EP 1 946 781A1 discloses a reactor for the sterilization of liquids and gases. The reactor consists of a tube through which the liquid or the gas flows. Deflector plates which have a photocatalytically active material are arranged in the tube at an angle of 70 to 110° to the direction of flow of the liquid or the gas. On the outsides of the tube, UV light sources are arranged which irradiate the deflector plates with UV radiation. EP 1 946 781A1 does not disclose reflective surfaces being arranged in the reactor.

The reactors described in the prior art for carrying out photocatalytic reactions, in particular for the photocatalytic purification of liquids, have the disadvantage that the photocatalytically active material is not completely exploited, since it cannot be ensured that the substance which is to be broken down in the liquid to be purified, the photocatalytically active material and the UV radiation meet each other in a sufficiently great extent. Owing to the mode of reactor construction which is known from the prior art, it is not possible, for example, that all of the UV radiation exiting from the UV light source impacts the photocatalytically active material. Only when the contact between the substance which is to be broken down from the stream to be purified, the photocatalytically active material and the UV radiation is as intense as possible, can a high breakdown rate be achieved with respect to the substance(s) to be broken down.

It is therefore an object of the present application to provide a reactor for carrying out photocatalytic reactions in which the photocatalytically active material and the light from the light source are exploited as completely as possible. It is a further object to provide a reactor in which, even at a small size, a large amount of stream to be treated can be treated. According to the invention this should be achieved by as far as possible all of the photocatalytically active material present in the reactor being reached by the radiation generated, in particular UV radiation.

These objects are achieved according to the invention by a reactor for the photocatalytic treatment of liquid or gaseous streams, which reactor comprises a tube through which the stream to be treated flows, wherein, in the tube, there are arranged at least one light source, at least one flat means M1 provided with at least one photocatalytically active material and at least one flat means M2 reflecting the radiation radiated by the at least one light source, wherein the reflecting surface of the at least one means M2 and the inner wall of the tube are at an angle greater than or equal to 0°, in such a manner that the light exiting from the light source is reflected by the at least one means M2 onto the photocatalytically active material.

The stream to be treated in the reactor according to the invention can be selected from all liquids or gases known to those skilled in the art.

Therefore, the present invention relates in one embodiment to the reactor according to the invention wherein the stream to be treated is a liquid. In addition, the present invention, in another embodiment, relates to the reactor according to the invention wherein the stream to be treated is a gas. Particularly preferably, in the reactor according to the invention, pollutant-comprising water or pollutant-comprising gas is treated. Particularly preferably, the treatment comprises a purification.

Therefore, according to the invention, "photocatalytic treatment of streams, in particular liquids or gases" is preferably taken to mean that wastewaters or exhaust gases in which interfering or toxic substances are present are purified. In the reactor according to the invention the wastewater or the exhaust gas is purified, i.e. after the purification the concentration of interfering substances is lower than previously. In the context of the present invention, the pollutant-comprising stream which is to be treated can originate, for example, from industrial plants, for example oil refineries, papermaking factories, mines, in the food sector or in the chemical industry, the private sector, for example sports facilities, restaurants, hospitals or can be of natural origin. In the case of exhaust gases as pollutant-comprising stream which is to be treated, these can also originate from combustion plants or internal combustion engines. Generally, the interfering substances which must be removed from the wastewater or the exhaust gas are selected from organic or inorganic substances which, if they were to remain in the wastewater or the exhaust gas, exhibit an interfering activity, for example due to a toxic activity, odor nuisance, coloring of the wastewater or exhaust gas, etc.

In a preferred embodiment of the present invention, the purification proceeds via chemical breakdown of organic or inorganic compounds, for example of organic acids, halogenated organic substances, aromatic or aliphatic organic substances, amines, oligomeric or polymeric materials, alcohols, ethers, esters, sugars, biodegradable or non-biodegradable substances, surfactants, ammonia, carbon monoxide, nitrogen oxides, salts, metal salts, heavy metals and mixtures thereof.

Preferably, the substances which can be removed according to the invention from the pollutant-comprising stream selected from organic compounds are selected from the group consisting of organic acids, halogenated organic substances, aromatic or aliphatic organic substances, amines, oligomeric or polymeric materials, alcohols, ethers, esters, sugars, biodegradable or non-biodegradable substances, surfactants, carbon monoxide, nitrogen oxides and mixtures thereof.

Generally, the reactor according to the invention comprises a tube. This tube can have generally any base known to those skilled in the art, for example round, polygonal, oval, asymmetric etc. In a preferred embodiment the reactor according to the invention is a tube having preferably a round cross section, i.e. a cylinder. It is also possible according to the invention that two or more of these tubes are operated next to one another, preferably in parallel, for example as a tube bundle. In a particularly preferred embodiment of the reactor according to the invention, the stream which is to be treated flows through the reactor continuously.

The diameter of the reactor is generally 50 mm to 500 mm, preferably 80 mm to 300 mm, particularly preferably 100 mm to 200 mm. The length of the reactor is generally dependent on the amount of the stream to be treated and/or the length of the UV sources which are accommodated therein. Generally, the length of the reactor according to the invention is 10 cm to 500 cm, preferably 40 cm to 300 cm. The diameter and the length of the reactor according to the invention can be selected by those skilled in the art to ensure that a sufficiently high treatment output of the reactor is achieved. A plurality of such reactors can be connected in series and/or parallel as desired in order to treat certain amounts of stream which is to be treated up to the desired degree of treatment, in particular degree of purity.

The reactor according to the invention generally has all of the connections necessary for the operation, for example feeds and outlets, which are necessary for operating the reactor. In particular, the reactor according to the invention has at least one feed, via which the stream which is to be treated is fed to the reactor. In addition, the reactor according to the invention has at least one outlet, via which the purified stream is removed from the reactor. The reactor according to the invention can also have other apparatus which are conventional and known to those skilled in the art, for example measurement sensors for determining various process parameters such as pressure, temperature, flow velocity, pH, radiation intensity.

The stream to be treated in the reactor according to the invention generally has a flow velocity in the reactor which makes possible a treatment which is as complete as possible, for example 0.001 m/s to 10 m/s, preferably 0.01 m/s to 0.1 m/s.

Generally, the at least one light source, preferably a UV light source, can be mounted in the reactor according to the invention at any desired site within the tube. In a preferred embodiment, the at least one light source is arranged in the middle of the tube, in particular in parallel to the tube. According to the invention "in the middle of the tube" means the region which is situated at a spacing of about 40 and 60% of the tube diameter, considered from one side of the tube. "Parallel", in the context of the present invention, means that the light source which is arranged in the tube has essentially the same distance from the tube walls at any point of its longitudinal extension. However, according to the invention, it is possible that deviations of up to 10%, based on the distance between the light source and the tube wall, are present. This can be the case, for example, because the at least one light source is not completely linearly shaped, or it is not orientated completely in parallel in the reactor.

According to the invention, one light source or two or more light sources can be used.

According to the invention, all light sources known to those skilled in the art, preferably UV light sources, can be used which radiate a radiation in the desired wavelength range which is suitable for activating the photocatalytically active material. According to the invention, the "UV radiation" preferably used is taken to mean electromagnetic radiation having a wavelength of 150 to 400 nm. In a preferred embodiment, therefore, a UV light source is used which radiates a UV radiation of wavelength 150 to 400 nm.

According to the invention, a light source is also taken to mean a light source which does not radiate UV radiation exclusively, but also electromagnetic radiation having other wavelengths, for example light having a wavelength $\lambda$ from 200 to 800 nm, for example a mercury medium- or high-pressure lamp, black light lamps, deuterium or xenon lamps, daylight lamps etc. or mixtures thereof.

The at least one UV light source used according to the invention generally has a light intensity at 365 nm, measured at a distance of 3 mm, of 0.01 to 1000 $mW/cm^2$, preferably 0.1 to 500 $mW/cm^2$.

The shape of the at least one UV light source is not fixed according to the invention. Generally, the at least one UV source is shaped in such a manner that the critical regions of the reactor according to the invention are radiated, preferably completely, with UV radiation. In a preferred embodiment, the UV light source is rod-shaped, wherein the base can be round, oval, polygonal or asymmetric. In a particularly preferred embodiment, a rod-shaped round UV light source is used. The UV light source, in a preferred embodiment, is surrounded with at least one material which separates off the UV light source from the pollutant-comprising stream which is to be purified and is simultaneously permeable to UV radiation, for example quartz, plastic or combinations thereof.

The reactor according to the invention for the photocatalytic treatment of streams, in addition to the at least one light source, also comprises at least one flat means M1 provided with at least one photocatalytically active material.

According to the invention the reactor comprises at least one flat means M1, preferably the reactor according to the invention comprises a plurality of flat means M1. "Flat", in the context of the present invention, is taken to mean the fact that the width and length of the corresponding means are significantly greater in comparison to the height.

The number of means M1 present in the reactor is dependent on the length of the reactor, and on the degree of pollution, the amount and/or flow velocity of the stream to be treated. In a preferred embodiment, as many means M1 are arranged in the reactor tube, in particular in parallel to one another, in such a manner that between two means M1 there is a distance of preferably 0.1 to 500 cm, particularly preferably 1 to 100 cm.

According to the invention the flat means M1 is furnished with at least one photocatalytically active material. In possible embodiments, the at least one flat means M1 is present in the form of photocatalytically active shaped bodies in all shapes known to those skilled in the art, for example spheres, monolith, extrudates or pellet, or the flat means M1 is furnished, for example coated, on the surface with at least one corresponding photocatalytically active material. In this embodiment it is possible according to the invention that the entire surface of the at least one means M1 is furnished with at least one photocatalytic material. In addition, it is also possible according to the invention that only a part of the surface of the at least one means M1 is furnished with at least one photocatalytically active material, for example 5 to 100%, preferably 50 to 100%, of the surface.

For example, in the reactor according to the invention, sheets, for example made of metal, for example iron, stainless steel, are used as means M1, the surface of which is at least in part coated with photocatalytically active material. In addition, honeycombs or foamed bodies coated with photocatalytic material can also be used. Methods for coating corresponding flat means with photocatalytic material are known to those skilled in the art, for example dipcoating, spraycoating, etc.

Therefore, the present invention also relates to a reactor according to the invention, wherein sheets are used as means M1, the surface of which sheets is at least in part coated with photocatalytically active material.

It is also possible according to the invention that meshes constructed in flat form, for example made of metal wire, plastic, glass or ceramic woven or knitted fiber cloth, are used as means M1, which form a cavity in which photocatalytically active material, for example in the form of pellets or rods, is present. The supporting cloth or nets can, for increasing the reactor efficiency, itself be furnished with photocatalytically active coatings.

Therefore, the present invention preferably relates to the reactor according to the invention, wherein photocatalytically active monoliths, nets having included extrudates of photocatalytic material or honeycombs or foamed bodies coated with photocatalytic material are used as means M1.

In a further preferred embodiment the at least one means M1 has pores. In this embodiment, on operation of the reactor according to the invention, the stream which is to be treated can flow through the means M1. One example of this embodiment according to the invention is a porous, for example perforated, sheet which is coated, at least in part, with at least one photocatalytically active material. A preferred example of this embodiment is a plate furnished with channels, which plate is sawn from a ceramic or metallic honeycomb body monolith in such a manner that the arrangement of the channels makes possible the flow of the pollutant-comprising stream. The plate preferably comprises at least one photocatalytically active material or is coated with at least one photocatalytically active material. A further preferred example of this embodiment is a plate made of a porous solid foam or sponge of ceramic, metal or plastic of a photocatalytically active material or which is coated with a photocatalytically active material.

The preferred pore size and pore number is dependent on the amount, the degree of pollution and the flow velocity of the stream which is to be treated, and can readily be determined by those skilled in the art. In a preferred embodiment, the pores have a size of 0.1 to 10 mm, especially preferably 1 to 5 mm. In a preferred embodiment, the volume of the pores, based on the total volume of the means M1, is less than 90%, particularly preferably less than 70%.

The at least one means M1 which is present according to the invention can generally be arranged in the reactor according to the invention at any position appearing suitable to those skilled in the art. In a preferred embodiment, the at least one means M1 is arranged with a flat side at an angle of 60 to 130°, preferably 80 to 100°, to the direction of flow of the stream to be treated. Since the at least one light source, in a preferred embodiment of the reactor according to the invention, is arranged in parallel to the reactor tube, the at least one means M1, in a preferred embodiment, is arranged with a flat side at an angle of 60 to 130°, preferably 80 to 100°, to the at least one light source.

The means M1 according to the invention can have a straight surface or a curved, for example convex or concave, surface.

Generally, the means M1 can be present in any suitable size, wherein the maximum size of the means M1 is fixed by the size of the reactor. In a particularly preferred embodiment, the means M1 has a size which corresponds to the diameter of the reactor. In connection with the abovementioned angle of the means M1 to the direction of flow of the stream which is to be treated, in a particularly preferred embodiment, this means that the at least one means M1 is arranged perpendicularly to the direction of flow over the entire diameter of the reactor. This particularly preferred arrangement of the at least one means in the reactor ensures that the means M1 comes into sufficient contact with the stream which is to be treated. Particularly in this embodiment, it must be ensured that the stream to be treated can flow through the at least one means M1, preferably through the abovementioned preferred embodiments.

Therefore, the present invention, in a preferred embodiment, relates to a reactor according to the invention, wherein the stream to be treated flows through the at least one means M1.

According to the invention, generally all photocatalytically active materials known to those skilled in the art can be used, for example metal oxides or semimetal oxides selected from the group consisting of modified or unmodified titanium dioxide ($TiO_2$), zinc oxide (ZnO), tungsten oxide ($WO_3$) and mixtures thereof. In a preferred embodiment, modified or unmodified titanium dioxide ($TiO_2$) is used as photocatalytically active material in the reactor according to the invention.

In a preferred embodiment of the reactor according to the invention, modified or unmodified titanium dioxide which is essentially in the anatase modification is used. "Essentially", in the context of the present invention, means that at least 50%, particularly preferably at least 60%, of the titanium dioxide is in the anatase modification, based on the XRD measurement method known to those skilled in the art. The remainder of the titanium dioxide comprises amorphous metal oxide, brookite or rutile modification titanium dioxide or a mixture thereof. In a very particularly preferred embodiment, the titanium dioxide used is >70% in the anatase modification, determined by XRD.

In a preferred embodiment, therefore, in the reactor according to the invention, a flat means M1 is used which comprises titanium dioxide, preferably in said preferred embodiments, or sheets at least in part coated with titanium dioxide are used.

In a further preferred embodiment, meshes made so as to be flat in which photocatalytically active material is present, for example in the form of pellets or rods, are used as means M1.

In a further preferred embodiment, nets having included extrudates of photocatalytic material or honeycombs or foamed bodies coated with photocatalytic material are used as means M1 in the reactor according to the invention.

For example, a rod-shaped titanium dioxide photocatalyst can be used in the reactor according to the invention. Preferably, this rod-shaped titanium dioxide photocatalyst has specific features with respect to BET surface area, pore volume, median pore diameter and geometry of the individual catalyst particles. These specific features, in particular the combination of these features, yield a particularly high activity, and also a particularly long lifetime of the photocatalyst used with unchangingly high activity.

Rod-shaped, in the context of the present invention, means that the photocatalyst used preferably has an oval or round base. The diameter of this round base or of an oval base in the largest extension is generally 0.2 to 10 mm, preferably 0.5 to 3.0 mm. The rod-shaped titanium dioxide photocatalyst generally has a length of 0.5 to 10 mm, preferably 0.8 to 8 mm, particularly preferably 1.0 to 5.0 mm. The ratio of length to diameter of the rod-shaped photocatalyst according to the invention is generally 0.05 to 50, preferably 1.0 to 10.

The rod-shaped photocatalyst preferably used comprises essentially titanium dioxide as photocatalytically active material, i.e. the photocatalyst used generally comprises at least 90% by weight, preferably at least 95% by weight, particularly preferably 97%, of titanium dioxide. The remainder is inorganic or organic additives, or a mixture thereof.

In a further preferred embodiment, the titanium dioxide photocatalyst comprises at least one additive, particularly preferably selected from groups 1, 4, 8, 9, 10, 11, 13, 14, 15 of the Periodic Table of the Elements (new IUPAC nomenclature) of the lanthanoids, for example selected from the group consisting of sodium, potassium, zirconium, cobalt, zinc, iron, copper, silver, gold, palladium, platinum, gallium, nitrogen, carbon, sulfur, fluorine, ytterbium, erbium, thulium, neodymium and mixtures thereof, in elemental or in oxidic form. Preferably, combinations of two or more of said additives can also be present.

The at least one additive is present in the rod-shaped titanium dioxide photocatalyst preferably used according to the invention in an amount preferably of 0.001 to 5% by weight, particularly preferably 0.01 to 3% by weight. If two or more of said additives are present simultaneously in the photocatalyst used according to the invention, then said quantitative details apply to this mixture.

The rod-shaped titanium dioxide photocatalyst preferably used according to the invention generally has a BET surface area of 20 to 200 $m^2/g$, preferably 30 to 180 $m^2/g$, particularly preferably 40 to 150 $m^2/g$. The BET surface area can be determined by methods known to those skilled in the art, for example as specified in DIN 66 131.

The rod-shaped titanium dioxide photocatalyst preferably used according to the invention has a pore volume of generally 0.1 to 1.00 ml/g, preferably 0.2 to 0.7 ml/g, particularly preferably 0.25 to 0.75 ml/g. The pore volume can be determined by methods known to those skilled in the art.

The rod-shaped titanium dioxide photocatalyst preferably used according to the invention generally has a median pore diameter of 0.001 to 0.050 µm, preferably 0.005 to 0.030 µm, particularly preferably 0.010 to 0.025 µm. The median pore diameter can be determined by methods known to those skilled in the art.

The rod-shaped titanium dioxide photocatalyst preferably used according to the invention can be produced by methods known to those skilled in the art. In a preferred embodiment, the photocatalyst preferably used according to the invention is obtained by mixing the corresponding amounts of titanium dioxide and at least one organic binder, preferably selected from sugar derivatives, for example tylose, starch solutions, for example edible starches, celluloses such as, for example, methylcellulose, and/or at least one fatty acid, for example stearic acid, polymers, such as, for example, polyethylene oxide and at least one acid, for example a mineral acid such as dilute nitric acid or hydrochloric acid or an organic acid such as formic acid. This mixture is mixed by methods known to those skilled in the art in customary apparatus, for example ground. The resultant mixture can then be extruded to form the corresponding rod-shaped photocatalysts. The extrudate thus produced is preferably dried at a temperature of at most 120° C., and the resultant rods are then preferably calcined in an air atmosphere at a temperature of 300 to 500° C., in order to obtain the combination according to the invention of BET surface area, pore volume and median pore diameter.

Just the use of tylose and stearic acid in the production of the titanium dioxide used according to the invention has the effect that the resultant titanium dioxide has the combination according to the invention of high activity and high stability with maintained high activity over a long time period.

It is characteristic of the present invention that in the reactor according to the invention at least one flat means M2 reflecting radiation, preferably UV radiation, is also arranged, and that the surface of this at least one flat medium M2 is at an angle with the inner wall of the tube greater than or equal to 0°, preferably greater than 0°. The formulation that the two said components are at an angle greater than 0° means that the at least one means M2 is not constructed according to the invention in such a manner that the smooth inner wall of the tube is provided with a reflecting layer.

In the reactor according to the invention, the at least one flat means M2 is mounted preferably on the inside of the tube and the reflecting surface thereof is at the abovementioned angle to the inner wall of the reactor of greater than or equal to, preferably greater than, 0°.

In a preferred embodiment the angle between the reflecting surface of the at least one means M2 and the inner wall of the reactor according to the invention is 5 to 85°, preferably 20 to 70°, particularly preferably 30 to 50°.

All flat means which are able to reflect radiation, preferably UV radiation, preferably completely, can be used according to the invention as means M2. Such means M2 are, for example, sheets or variously shaped ring bodies, for example made of metal, glass, plastic, which are at least in part coated with a reflector, preferably a UV reflector. Particularly preferred means M2 according to the invention are iron, glass, plastic sheets or ring bodies coated with a gold or silver layer.

The surface of the at least one means M2 can be linear or curved, for example convex or concave. The shape and angle of the reflecting surfaces must be adapted to the shape, size and/or spacing of the flat photocatalytically active means M1 in such a manner that the light from the light source(s) is distributed as completely as possible, particularly preferably as uniformly as possible, along the entire catalytic surface of the means M1.

In the reactor according to the invention, generally, enough means M2 are arranged that the radiation radiated by the at least one light source is reflected to a sufficient extent onto the means M1. In a preferred embodiment, at least one means M2 is assigned to each means M1, which means M2 reflects the light radiation radiated by the at least one light source onto the corresponding means M1. By means of this arrangement according to the invention of the means M2, in the reactor according to the invention the light radiation radiated by the light source is successfully deflected, preferably completely, onto the photocatalytically active material. The irradiation of the first and last means M1 seen in the direction of flow can be excluded therefrom in a preferred embodiment.

In a particularly preferred embodiment, in the reactor according to the invention, a means M2 is assigned to each individual means M1, wherein the means M2 is preferably arranged in such a manner that it has contact with the inner wall of the reactor tube by at least one side and, by two further sides, has contact with the corresponding means M1 and, by a second adjacent means M1 or the end of the reactor tube, i.e. the means M2 preferably acts as spacer between two adjacent means M1 or between one means M1 and the end of the reactor tube. The angle between the reflecting surface of the means M1 and the corresponding M2 is generally 5 to 85°, preferably 20 to 70°.

Optionally, at least one oxidizing agent can be added to the reactor according to the invention, in particular during operation. By adding the at least one oxidizing agent, the purification performance of the reactor can be further increased. Oxidizing agents which are suitable according to the invention are liquid or gaseous and are selected, for example, from the group consisting of oxygen, mixtures possibly comprising oxygen, for example air, hydrogen peroxide, ozone, peroxydisulfate, nitrates, nitric acid, nitrogen oxides, chlorine oxide, chlorine and mixtures thereof. Especially in the case of phenolic impurities in the stream which is to be treated, the addition of oxidizing agents, in particular hydrogen peroxide, causes an improvement of the purification performance of the reactor according to the invention.

Therefore, the present invention relates in particular also to a reactor according to the invention, wherein at least one oxidizing agent is added to the pollutant-comprising stream which is to be purified.

The reactor according to the invention has apparatus known to those skilled in the art for adding the at least one oxidizing agent, for example valves, feed apparatus, connections etc.

The present invention also relates to a method for the photocatalytic treatment of streams by irradiation with light, which comprises carrying the method out in a reactor according to the invention. Methods for the photocatalytic treatment of liquid or gaseous streams, in particular for the photocatalytic purification of exhaust gases or wastewaters contaminated with organic and/or inorganic substances, are known in principle to those skilled in the art.

In a preferred embodiment, the present invention relates to the method according to the invention, wherein the stream to be treated is pollutant-comprising water.

In a further preferred embodiment, the present invention relates to the method according to the invention, wherein at least one oxidizing agent is added to the stream which is to be treated.

That stated with respect to the reactor according to the invention applies with respect to the method according to the invention.

The method according to the invention is generally carried out at the temperature relevant for the treatment to be carried out, for example, for the photocatalytic purification of waters, at temperatures of 4 to 80° C., preferably 15 to 50° C. Other process parameters are known to those skilled in the art.

A particularly preferred embodiment of the present invention is illustrated by FIG. 1.

In the FIG. 1, the reference signs have the following meanings:
1 tube
2 UV light source
3 inlet
4 outlet
5 net filled with titanium dioxide rods
6 reflectors
7 angle between tube and reflector surface

EXAMPLES

Example 1

The reactor is 510 mm long and 168 mm wide having a reactor volume of 8 l. The lamp is a medium-pressure radiator having a maximum luminous power of 4.5 kW. The lamp can be dimmed. Means M1 are 1.5 mm $TiO_2$ rods encapsulated in PVDF inlays. The total active surface area is 3600 $cm^2$. The rods are fastened by a shrinkable net. Ten means M1 are used. Means M2 are seated on the outer reactor wall between the means M1, reflect the radiated light and are 28 mm high, 12 mm wide at the bottom and 8 mm wide at the top. Eleven means M2 are used. The distance between the means M1 is equal to the thickness of means M2 (28 mm). The reactor is upright. The stream which is to be treated flows from a 50 l storage vessel via the means M1 from bottom to top and back into the storage vessel at a flow rate of 1 $m^3$/h. The stream which is to be treated is cooled in the storage vessel to <40° C. In the storage vessel, passive air exchange can take place.

The stream which is to be treated is deionized water having 0.5 g/l of dichloroacetic acid (DCA). The pH of the DCA solution is adjusted to pH 3. The photocatalytic purification of the stream is defined via the amount of DCA broken down after 24 h reaction time in g/h and is determined via pH measurements. The DCA solution is circulated through the reactor by pumping over the course of >8 h without illumination, after which the lamp was switched on and run at 400 W luminous power. After 24 h the photocatalytic breakdown rate is 0.46 $g_{DCA}$/h.

Example 2

The reactor of example 1 is used. The stream which is to be treated is deionized water having 1.0 g/l of dichloroacetic acid (DCA). The pH of the DCA solution is adjusted to pH 3. The photocatalytic purification of the stream is defined via the amount of DCA broken down in g/h and is determined via pH measurements. The DCA solution is circulated through the reactor by pumping over the course of >8 h without illumination, after which the lamp is switched on and run at 400 W luminous power. After 24 h the photocatalytic breakdown rate is 0.81 $g_{DCA}$/h.

Example 3

The reactor of example 1 is used. The stream which is to be treated is deionized water having 2.2 g/l of dichloroacetic acid (DCA). The pH of the DCA solution is adjusted to pH 3. The photocatalytic purification of the stream is defined via the amount of DCA broken down in g/h and is determined via pH measurements. The DCA solution is circulated through the reactor by pumping over the course of >8 h without illumination, after which the lamp is switched on and run at 400 W luminous power. After 24 h the photocatalytic breakdown rate is 1.70 $g_{DCA}$/h.

Example 4

The reactor of example 1 is used. The stream which is to be treated is deionized water having 2.2 g/l of dichloroacetic acid (DCA). The pH of the DCA solution is adjusted to pH 3.

The photocatalytic purification of the stream is defined via the amount of DCA broken down in g/h and is determined via pH measurements. The DCA solution is circulated through the reactor by pumping over the course of >8 h without illumination, after which the lamp is switched on and run at 400 W luminous power. Air is fed into the gas space of the storage vessel (10 l/h). After 24 h the photocatalytic breakdown rate is 2.41 $g_{DCA}$/h.

Example 5

The reactor of example 1 is used. The stream which is to be treated is deionized water having 2.2 g/l of dichloroacetic acid (DCA). The pH of the DCA solution is adjusted to pH 3. The photocatalytic purification of the stream is defined via the amount of DCA broken down in g/h and is determined via pH measurements. The DCA solution was circulated through the reactor by pumping over the course of >8 h without illumination, after which the lamp is switched on and run at 800 W luminous power. After 24 h the photocatalytic breakdown rate is 4.64 $g_{DCA}$/h.

The invention claimed is:

1. A reactor for the photocatalytic treatment of liquid or gaseous streams, the reactor comprising a tube through which the stream to be treated flows, wherein at least one light source, at least one flat means M1 including at least one photocatalytically active material, and at least one flat means M2 reflecting light radiated by the at least one light source are disposed within the tube, and wherein the reflecting surface of the at least one flat means M2 and an inner wall of the tube are at an angle of 5 to 85°, such that light radiated from the at least one light source is reflected by the at least one means M2 onto the photocatalytically active material, and wherein the angle between the reflecting surface of the at least one flat means M1 and the corresponding at least one flat means M2 is 5 to 85°.

2. The reactor according to claim 1, wherein the at least one light source is arranged in the middle of the tube.

3. The reactor according to claim 1, wherein the at least one flat means M1 is arranged with a flat side at an angle of 60 to 130° to the direction of flow of the stream to be treated.

4. The reactor according to claim 1, wherein the stream to be treated flows through the at least one means M1.

5. The reactor according to claim 1, wherein modified and/or unmodified titanium dioxide ($TiO_2$) is used as the at least one photocatalytically active material.

6. The reactor according to claim 1, wherein photocatalytically active monoliths, nets having included extrudates of photocatalytic material or honeycombs or foamed bodies coated with photocatalytic material are used as the at least one flat means M1.

7. The reactor according to claim 1, wherein at least one oxidizing agent is added to the stream which is to be treated.

8. The reactor according to claim 1, wherein the stream to be treated is a liquid including one or more pollutants.

9. The reactor according to claim 1, wherein the stream to be treated is a gas including one or more pollutants.

10. A method for the photocatalytic treatment of a liquid or a gaseous stream by irradiation with light, comprising irradiating the liquid or gaseous stream in a reactor according to claim 1.

11. The method according to claim 10, wherein the stream to be treated is water.

12. The method according to claim 10, wherein at least one oxidizing agent is added to the stream to be treated.

* * * * *